United States Patent [19]

Allen

[11] 4,268,996
[45] May 26, 1981

[54] TRACK FOR SLIDING CLOSURE

[75] Inventor: Denis L. C. Allen, Chelmsford, England

[73] Assignee: Ford Motor Company, Dearborn, Mich.

[21] Appl. No.: 80,607

[22] Filed: Oct. 1, 1979

[30] Foreign Application Priority Data

Nov. 15, 1978 [GB] United Kingdom ............... 44683/78

[51] Int. Cl.³ .............................................. E05D 15/10
[52] U.S. Cl. ....................................... 49/212; 49/218; 49/223
[58] Field of Search ................. 49/209, 216, 218, 219, 49/212, 213, 223, 225

[56] References Cited

U.S. PATENT DOCUMENTS 1,996,310 4/1935 Skoogh ............................. 49/212 X
3,019,492 2/1962 Schimek ................................. 49/212

Primary Examiner—Kenneth Downey
Attorney, Agent, or Firm—John J. Roethel; Clifford L. Sadler

[57] ABSTRACT

A track assembly for a sliding closure member comprising a track extending in a longitudinal direction. A support arm is mounted at one end in the track for travelling movement along the track by a connecting means which retains the arm generally perpendicular to the track during part of the travelling movement. The connecting means also permits rotation of the arm about an axis perpendicular to the common plane of the track and arm in one end region of the track. The connecting means comprises a ball roller mounted on the arm for rolling movement along the track when the arm is generally perpendicular to the track. The ball roller also permits rotation of the connecting means about the axis perpendicular to the common plane of the arm and the track. A holding means engages the connecting means to prevent such rotation when the connecting means is not positioned in the end region of the track.

15 Claims, 11 Drawing Figures

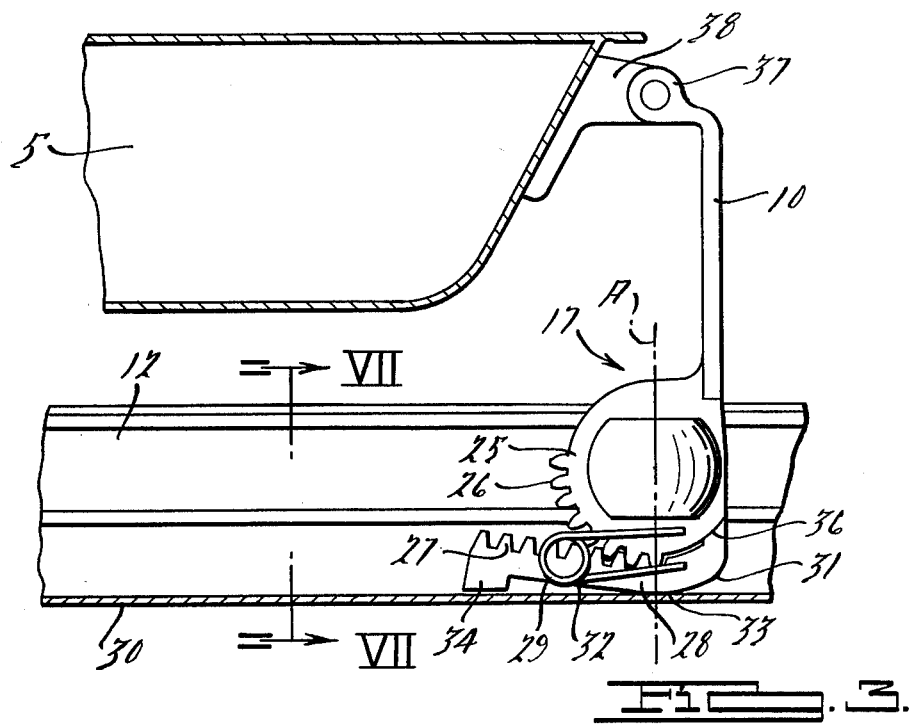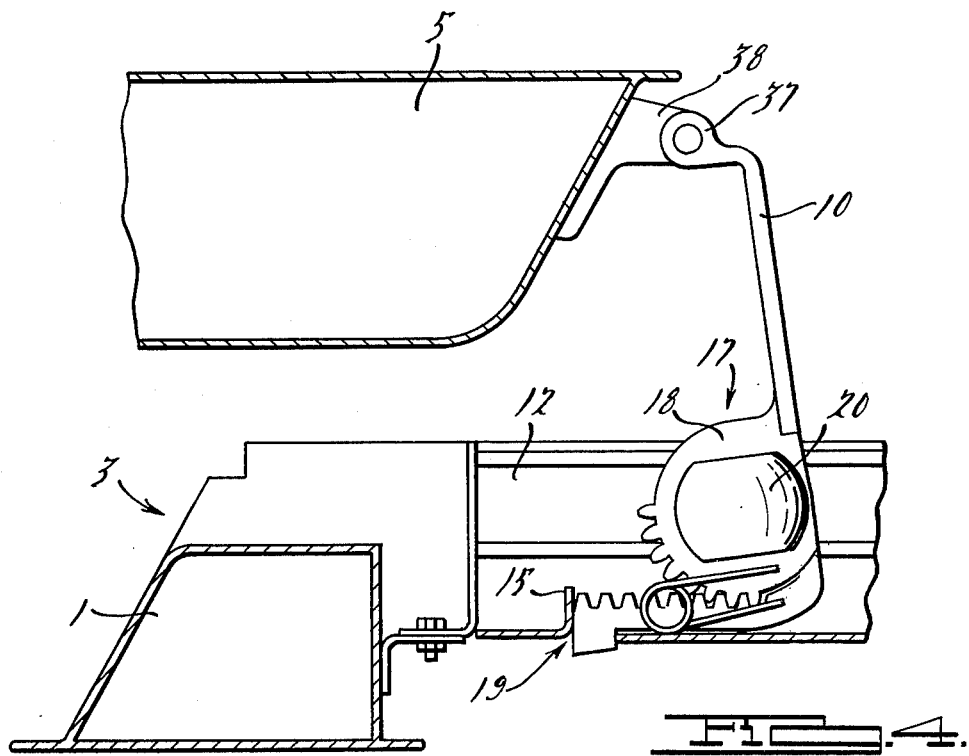

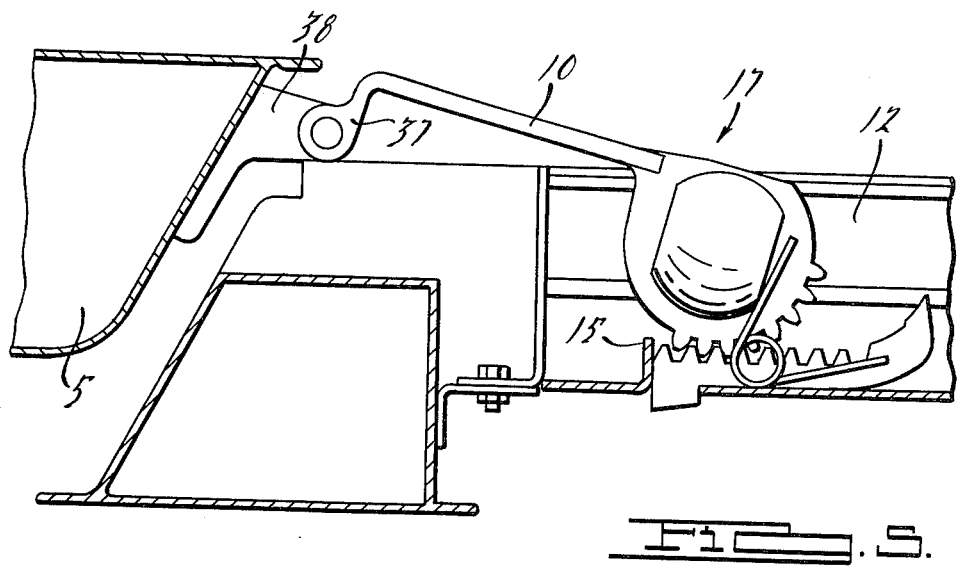
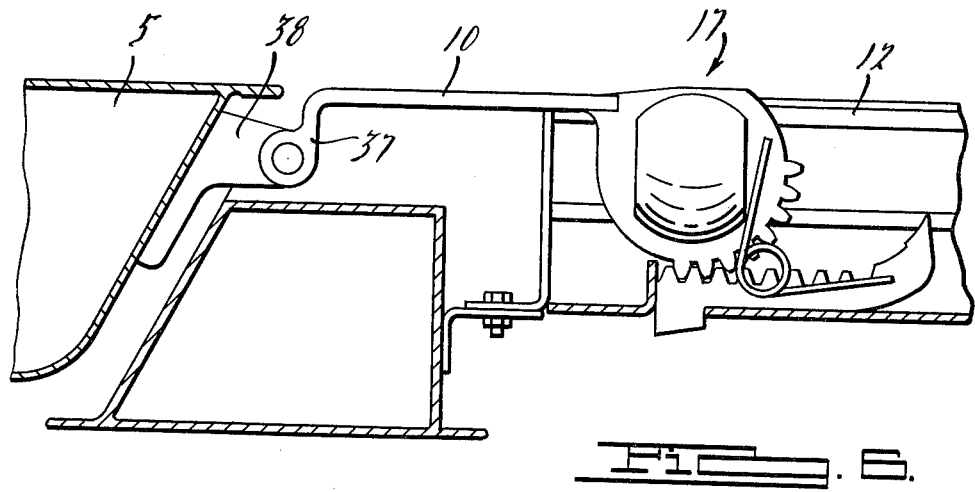
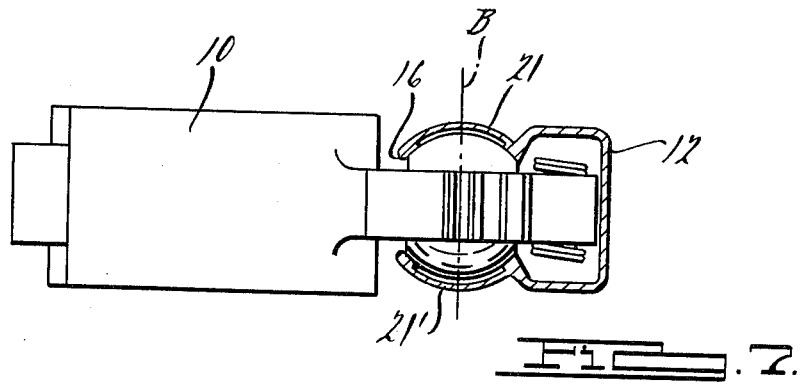

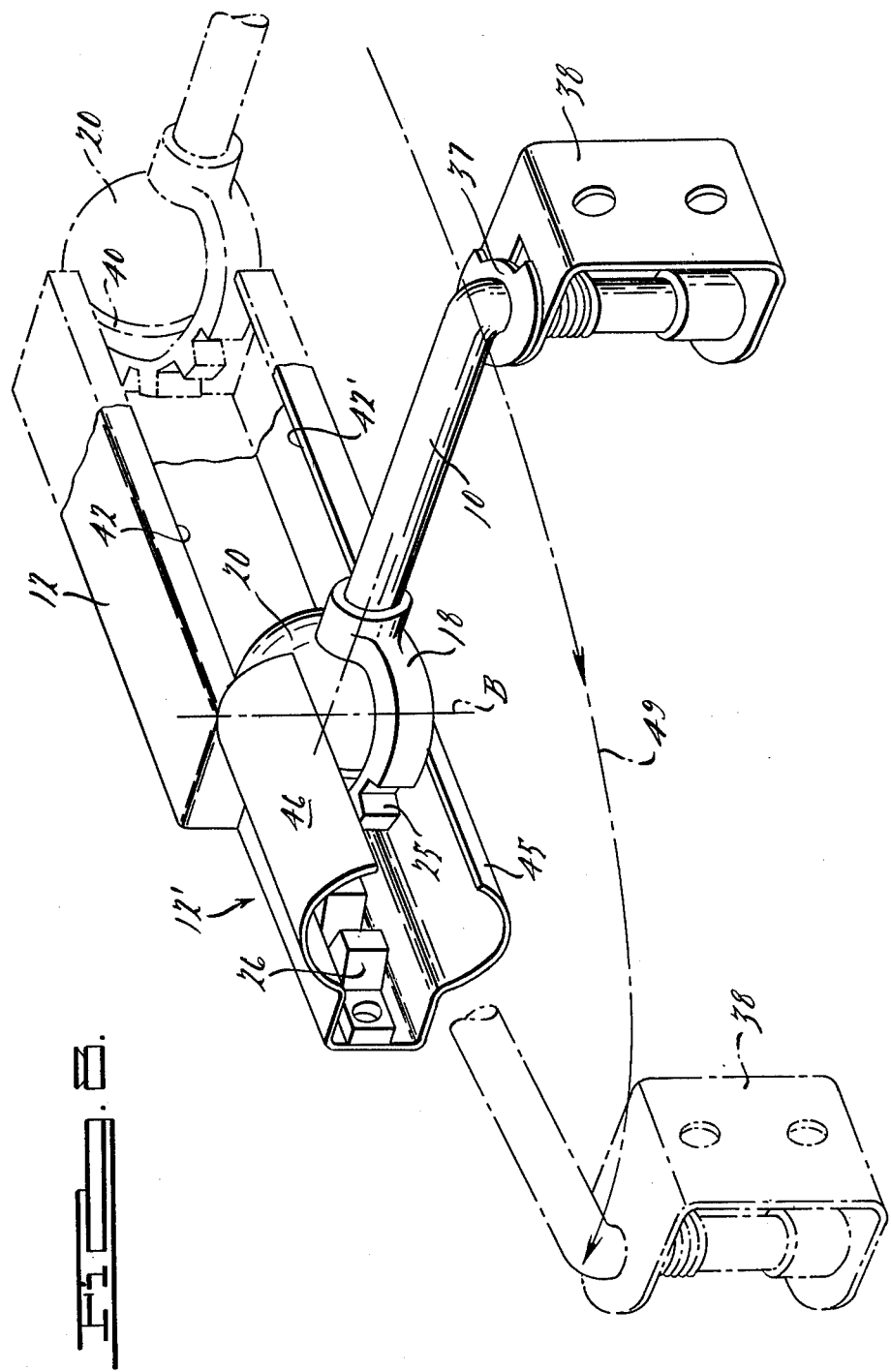

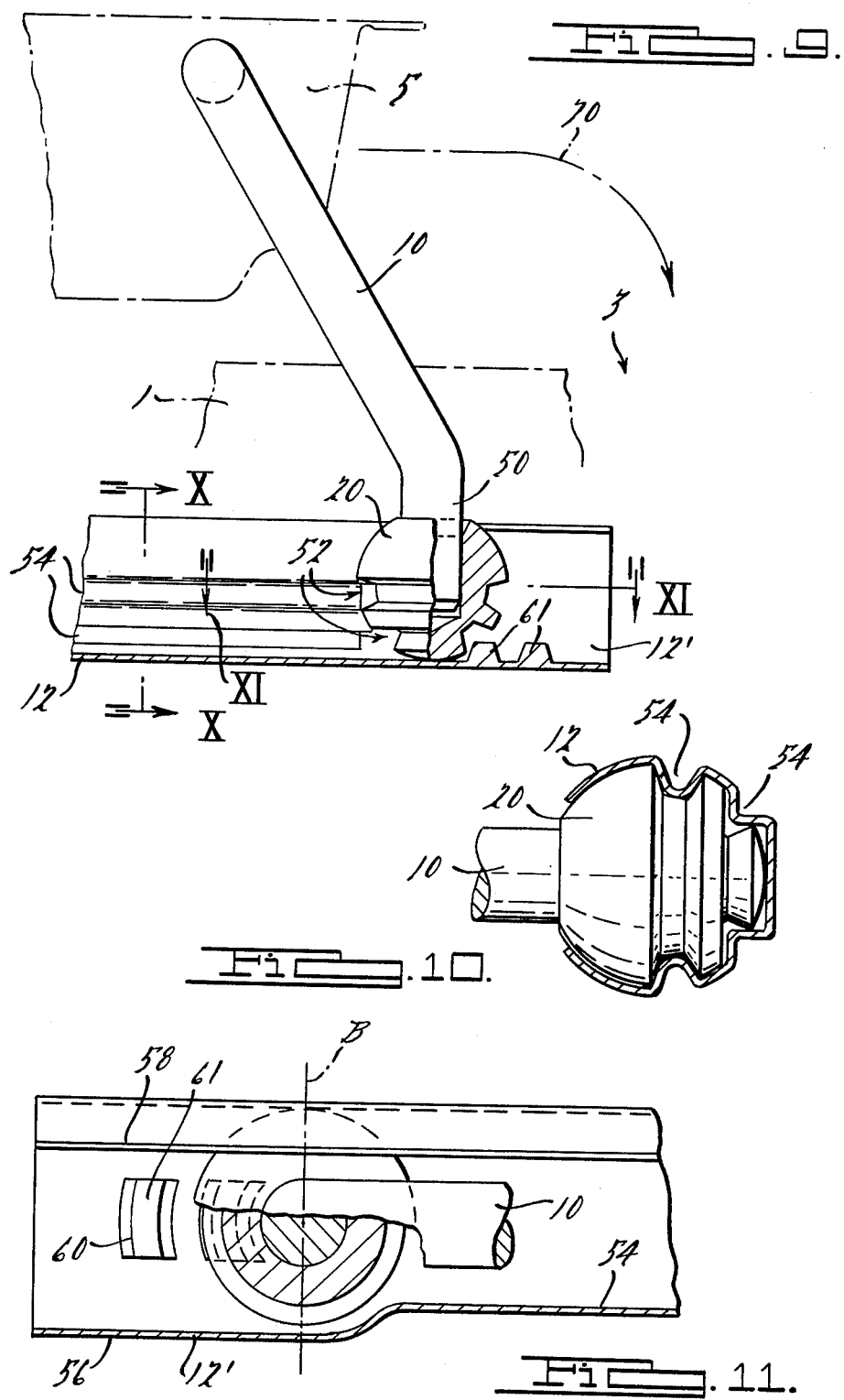

TRACK FOR SLIDING CLOSURE

BACKGROUND OF THE INVENTION

This invention relates to track assemblies for sliding closure members, in particular for sliding vehicle doors.

In one known type of sliding closure system used widely for vehicle doors, when closed, the external surface of the door lies flush with the external surface of the surrounding frame. When the closure is opened, its initial movement is generally in a direction perpendicular to the plane of the aperture so that the closure is moved clear of the surrounding frame. The closure is then moved in a direction parallel to the plane of the aperture to allow entry into the aperture.

In order to allow this movement, the closure is supported on a number of track assemblies, one of which includes a support arm mounted in a track by a connection which retains the support arm generally perpendicular to the track during the movement of the closure parallel to the plane of the aperture and permits rotation of the arm about an axis perpendicular to the common plane of the track and arm in one end region of the track to allow the closure to move into and out of the aperture in a direction perpendicular to the plane of the aperture.

Such track assemblies have included at least two sets of bearings, one of which is effective to carry the closure member on the track, the other of which carries the support arm and permits rotation thereof as the closure enters or leaves the aperture.

The construction of such track assemblies is relatively complicated and expensive. As a result, it has become the usual practice to incorporate only one such track assembly in a sliding door assembly, the remaining track assemblies having rigidly connected support arms which travel along a track having arcuate end regions. The end regions of track assemblies of this type project outside the plane of the aperture. Consequently, in vehicles, the track assemblies encroach into the passenger or storage area of the vehicle where they occupy useful space and are susceptible to damage.

SUMMARY OF THE INVENTION

In accordance with the present invention, we provide a track assembly for a sliding closure member comprising a track extending in a longitudinal direction. A support arm is mounted at one end in the track for travelling movement along the track by a connecting means which retains the arm generally perpendicular to the track during part of the travelling movement and permits rotation of the arm about an axis perpendicular to the common plane of the track and arm in one end region of the track. The connecting means comprises a ball roller mounted on the arm for rolling movement along the track when the arm is generally perpendicular to the track and permits rotation of the connecting means about the axis perpendicular to the common plane of the arm and the track. A holding means engages the connecting means to prevent such rotation when the connecting means is not positioned in the end region of the track.

The ball roller in the connecting means between the arm and the track thus acts as a bearing for the arm in both the movement along the track, and the rotation of the arm in the end region of the track. As a result, the construction of the assembly is simplified and its cost reduced.

Although the track assembly can be used in combination with conventional track assemblies having arcuate end regions and fixed support arms, the simplicity of its design enables it to be used in a sliding closure mechanism in which all the track assemblies are identical.

The invention, therefore, specifically includes a sliding closure mechanism, especially a vehicle body door, comprising a frame defining an aperture. A closure member is mounted for sliding movement into and out of the aperture and is connected to the frame by two or more, preferably three, slidable connections, at least one of which, and preferably each, comprises a track assembly in accordance with the invention.

Since the tracks can be straight, the closure member may be mounted either on the door or on the frame without encroachment into a passenger or load compartment. In the preferred embodiment of the invention, the closure member is supported by three track assemblies according to the invention. The tracks of two of the track assemblies are mounted on the frame and the track of the third is mounted on the door.

In order to provide a positive control over the movement of the arm in the end region of the track, the assembly preferably includes means engageable with the connecting means when the arm is in the end region of the track for effecting a rolling movement of the arm along the track in the common plane of the arm and the track, that is to say, for rotating the connecting means about the axis perpendicular to the common plane while the connecting means moves along the end region of the track.

Conveniently, the means for producing this rolling movement of the arm comprises a rack which is fixed relative to the track, at least when the connecting means is in the end region of the track, and engageable with a pinion portion on the connecting means when the connecting means is in the end region of the track. Preferably, the pinion portion is positioned such that it engages the rack at a point diametrically opposite the arm relative to the axis perpendicular to the said common plane when the arm lies parallel to the track in the end region of the track so that initial opening forces in the longitudinal direction produce a maximum moment about the said axis. In one embodiment of the invention, the pinion portion is defined by circumferential grooves on the ball roller. In another embodiment, the pinion portion is formed by teeth on a cage in which the ball roller is rotatably mounted.

The rack may be permanently fixed relative to the track. In the preferred embodiment, however, the rack is mounted on the connecting means for movement therewith along the track, means being provided for retaining the rack in a fixed position relative to the track when the connecting means is in the end region of the track.

Any suitable means may be adopted for preventing the connecting means from rotating about the axis perpendicular to the common plane of the arm and track. For example, the ball roller may include a circumferential groove which engages with a longitudinally extending ridge in the track. Where the rack is carried by the connecting means, the rack itself may be constructed to prevent such rotation of the connecting means when the connecting means does not lie in the end region of the track.

Thus, in the preferred embodiment of the invention, the rack is mounted for rocking movement relative to the track and rotation of the connecting means about the axis perpendicular to the common plane of the track, and the arm rocks the rack between a locking position, in which the rack prevents the following movement of the arm, and a releasing position, in which the arm can roll along the track, the rack being prevented from entering the releasing position by engagement with a wall portion of the track when the connecting means is not positioned in the end region of the track.

DESCRIPTION OF THE DRAWINGS

Various embodiments of the invention will now be described, by way of example only, with reference to the drawings, in which:

FIG. 3 is a plan, partly in cross-section, of one of the track assemblies incorporated in the sliding door mechanism of FIGS. 1 and 2;

FIGS. 4 to 6 are views similar to FIG. 3 showing the track assembly in a different configuration;

FIG. 7 is a partial vertical cross-section of the track assembly taken along line VII—VII of FIG. 3;

FIG. 8 is a perspective view of an alternate track assembly in accordance with the invention;

FIG. 9 is a plan, partly in cross-section, of a further alternate track assembly in accordance with the invention;

FIG. 10 is a partial end view of the assembly of FIG. 9; and

FIG. 11 is a part sectional side view of the assembly of FIG. 9.

DETAILED DESCRIPTION OF THE INVENTION

Figure 1:
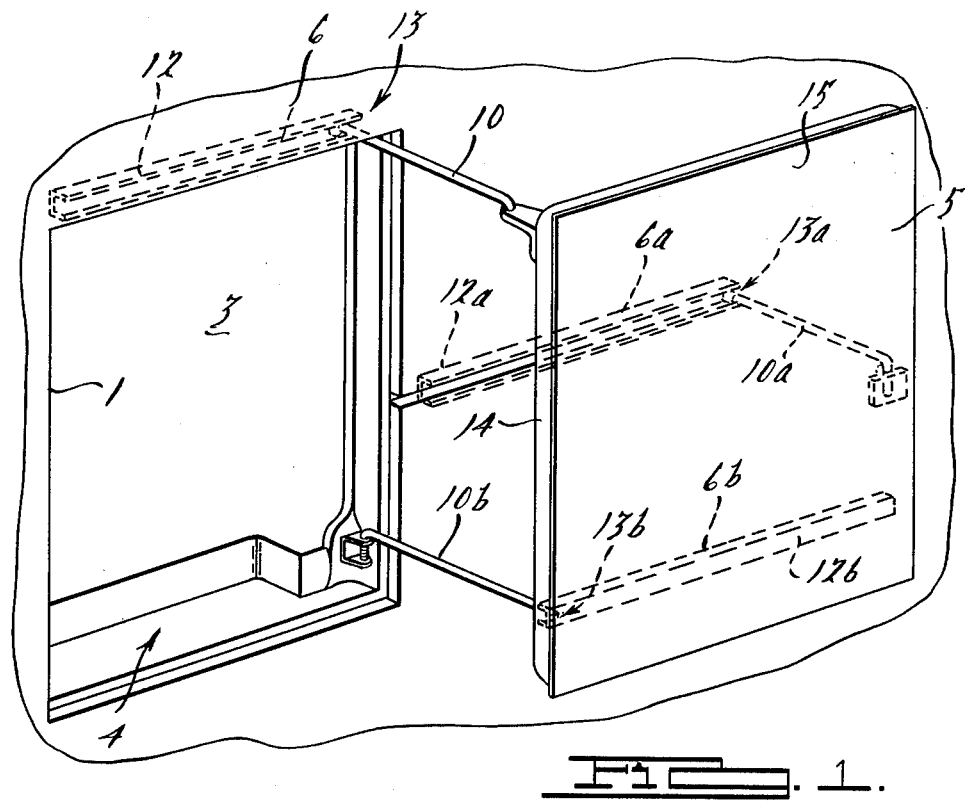
FIG. 1 is a perspective view of a sliding door mechanism of a motor vehicle incorporating three track assemblies according to this invention.
Figure 2:
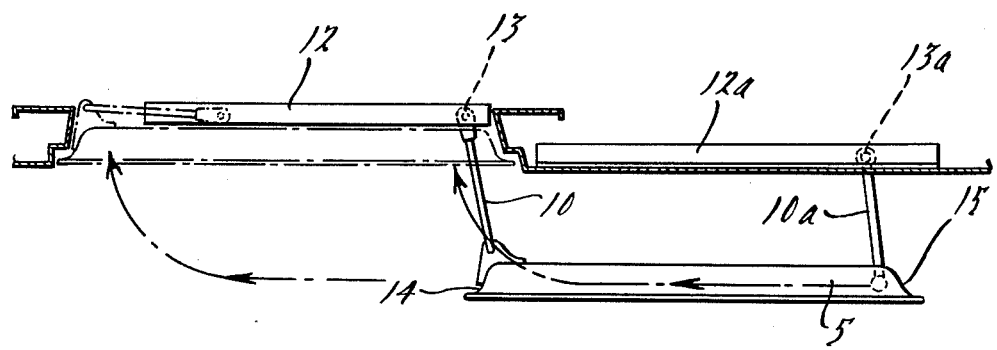
FIG. 2 is a plan of the mechanism of FIG. 1.

Referring to the drawings, FIGS. 1 and 2 illustrate a sliding door mechanism suitable for incorporation in the side wall of a motor van. The side wall includes a frame 1 defining a rectangular aperture 3. A sill and step 4 lie along the bottom wall of the aperture and lead into a passenger or storage compartment. A door 5 is mounted for sliding movement on the frame 1 by means of three similar track assemblies 6, 6a and 6b. In its open position, illustrated in full lines, the door 5 lies parallel to and adjacent the aperture 3; in its closed position, illustrated in broken lines in FIG. 2, the door 5 lies within the aperture 3 with its external surface flush with the side wall of the van.

Each track assembly, 6, 6a and 6b, comprises a support arm 10, 10a, 10b, and a track 12, 12a and 12b. Each support arm is mounted at one end in the track by a connecting means 13, 13a and 13b, and is pivotally connected at its other end to the frame 1 or the door 5.

The first track assembly 6 is positioned along the upper edge of the aperture 3 with its track mounted in the frame 1 and its support arm 10 is pivotally connected to the upper corner of the door 5 adjacent the left-hand edge 14a thereof, as seen in the drawings. The second track assembly 6a also has its track mounted in the frame 1 and is positioned to one side of the aperture 3. In the embodiment illustrated, the track is positioned at about mid-point of the aperture. The track may, however, be positioned at any point adjacent the aperture, for example, towards the top thereof. In any event, the support arm 10a of the assembly is pivotably connected to the door 5 adjacent the right-hand edge 14b of the door 5. The third track assembly 6b is positioned along the lower edge of the door with its track mounted in the door 5, the support arm 10b being pivotably connected to the frame 1 in the lower right-hand corner of the aperture. Since the track 12c is mounted in the door, rather than on the lower edge of the aperture 5, the track is protected from damage during loading of the vehicle compartment.

The first track assembly 6 will be described in more detail with reference to FIGS. 3 to 5. The second and third assemblies 6a and 6b are of similar construction, and need not therefore be described in detail.

Referring to FIGS. 3 to 7, the track 12 comprises a straight longitudinal extending body of uniform cross-section which is conveniently formed by extrusion. A slot 16 (FIG. 7) runs along the length of the body and receives the connecting means 13, now indicated more particularly as 17 in FIGS. 3 to 7, mounted on one end of the support arm 10. The end region of the track includes a flange 15 which is pressed out to reveal an aperture 19 on the side of the flange further from the end of the track 12. The connecting means 17 comprises a cage 18 in which a ball roller 20 is mounted for rotation about an axis A which is generally at 90° to the longitudinal direction of the track when the support arm extends generally perpendicular to the track, as illustrated in FIG. 3. The ball roller 20 is accommodated between two channel portions 21, 21' of the track 12 which are shaped to conform to the spherical surface of the ball roller 20 so that the connecting means 17 can also rotate about an axis B perpendicular to the common plane of the support arm 10 and the track 12 (see FIG. 7).

The cage 18 (FIG. 4) defines a part circular pinion portion 25 which extends along the outer edge of the cage about the axis B. The teeth 26 of the pinion portion 25 mesh with a row of teeth 27 on a rack 28 which is mounted on the connecting means 17 for movement therewith along the track by means of a spring 29 which biases the rack into engagement with a side wall 30 of the track 12 opposite the slot 16.

The surface of the rack adjacent the side wall 30 of the track which lies on the axis of rotation A of the ball roller 20 is cut away at 31, 32 to reveal a ridge 33 and an abutment member 34 which is shaped to conform to the configuration of the aperture 19 in the end region of the track 12. An end stop 36 is formed adjacent the row of teeth 27 at the end of the rack 29 opposite the abutment 34, the end stop being engageable with the cage 18.

The opposite end of the support arm 10 carries a boss 37 which is connected to a bracket 38 mounted on the door 5. The bracket 38 and the boss 37 permit relative pivotal movement through 90° about a vertical axis between the positions indicated in FIGS. 3 and 6. Stop surfaces on the boss 37 and the bracket 38 prevent relative rotation beyond this range of movement.

When the door is fully open (FIG. 3), the support arm 10 extends outwardly from the track 12 so that the axis of rotation A of the ball roller 20 lies perpendicularly to the longitudinal direction of the track 12; and the rack 28 is held by the spring 29 with the abutment member 34 and the ridge 33 in engagement with the side wall 30 of the track. In this position, the toothed surface of the rack is inclined to the side wall 30. Since the connecting means 17 cannot move laterally in the track 12, the pinion portion 26 cannot roll along the rack 28. Nevertheless, the ball roller 20 is free to roll along the track between the channel sections 21, 21' so that the door 5 can move parallel to the side of the vehicle body.

When the connecting means 17 reaches the end region of the track (as illustrated in FIG. 4), the abutment 34 on the rack engages the in-turned flange 15 on the track 12, thus preventing further movement of the rack 28 along the track 12. The rack 28 then rocks about the ridge 33 so that the abutment enters the aperture adjacent the flange. In this position (illustrated in FIG. 4), the surface of the rack carrying the teeth 27 lies parallel to the side wall 30 of the track 12 and the rack 28 no longer prevents the pinion portion 26 from travelling along the rack.

Since the ball roller 20 has a spherical surface, it is free to rotate about the axis B between the channel portions 21, 21' of the track 12, thus allowing the arm 10 to effect a rolling movement along the track 12 in the common plane of the track 12 and the arm 10, as illustrated in FIGS. 4 to 6. The door 5 thus completes its movement in the direction parallel to the plane of the aperture and is moved into the aperture 3 to lie with its surface flush with the body of the vehicle, as shown in FIG. 6.

When the door 5 is opened, a force is applied to the door 5 in the longitudinal direction of the track 12. This force will be applied to the connecting means 17 through the support arm 10. As best seen in FIG. 6, when the door 5 is closed, the arm 10 is positioned diametrically opposite the point at which the pinion portion 26 is engaged with the rack 29. The moment exerted on the connecting means 17 about the axis B is therefore a maximum so that the opening force on the door 5 immediately rotates the connecting means 17 about the axis B causing the pinion 26 to travel along the rack 29. The connecting means 17 therefore rolls along the track towards the position illustrated in FIG. 4. The engagement of the abutment 34 in the aperture 15 prevents the rack 29 from sliding along the track during this movement of the connecting means 17. When the cage 28 engages the end stop 36 on the rack, the rack rocks about the ridge 33 so that the abutment 34 disengages from the aperture 19. Further pivotal movement of the arm is prevented by the engaging stop surfaces on the boss 37 on the outer end of the arm 10 and the bracket 38 to which it is connected. The axis of rotation of the ball roller 20 is now aligned at right angles to the longitudinal direction of the track 12 so that the roller 20 can roll along the track with the arm 10 projecting laterally therefrom.

In the embodiment of the invention illustrated in FIG. 8, the ball roller 20 is provided with a circumferential groove 40 extending in a plane perpendicular to the axis of rotation of the ball roller 20 relative to the cage 18. The roller 20 is received between two longitudinally extending ridges 42, 42' in the track 12 which engage in the circumferential groove 40 to prevent rotation of the connecting means 17 about an axis B perpendicular to the common plane of the track 12 and arm 10 when the connecting means 17 is displaced from the end region of the track.

In the end region 12' of the track, the ball roller is received in semi-circular track sections 45, 46 which permit the roller to rotate about the axis B. The end region 12' of the track also carries a rack 48 which is permanently secured therein. As the ball roller enters the end region of the track, a pinion portion 25 of the cage 18 in which the roller 20 is mounted engages the rack 28 and effects rotation of the arm 10 about the axis B as the connecting means 17 moves towards the end of the track 12, as illustrated by the arrow 49.

In the embodiment illustrated in FIGS. 9, 10 and 11, the ball roller 20 is mounted for rotation about a stub shaft 50 formed on the end of the arm 10. The ball roller 20 includes two circumferential grooves 52 which lie in parallel planes perpendicular to the axis of rotation of the roller 20. As best seen in FIG. 10, the track includes longitudinally extending ridges 54 which engage with the grooves 52 in the roller 20. The ridges 54 terminate at the end region 12' of the track (see FIG. 11) where the track 12 includes two semi-circular channel sections 56, 58 within which the ball roller 20 is free to rotate about an axis B perpendicular to the common plane of the arm 10 and track 12. A rack 60 is secured to the side wall of the track within the end region 12' of the track and has teeth 61 which are shaped to engage with the circumferential grooves 52 in the ball roller, thus causing the roller 20 to rotate about the axis B as it travels along the end region 12' of the track. The connecting means 17 therefore rolls along the rack in the end region 12' of the track so that the arm 10 swings the door 5 into the aperture 3 generally in the direction of the arrow 70 to lie flush with the surrounding walls 1.

I claim:

1. A track assembly for a sliding closure member comprising a track extending in a longitudinal direction and a support arm mounted at one end in the track for traveling movement along the track by a connecting means which retains the arm generally perpendicular to the track during part of the traveling movement and permits rotation of the arm about an axis perendicular to the common plane of the track and arm in one end region of the track, control means engageable with the connecting means when the arm is in the end region of the track for effecting a rolling movement of the arm along the track in the said common plane, the control means for effecting the rolling movement of the arm comprising a rack which is fixed relative to the track at least when the connecting means is in the end region of the track, the rack being engageable with a pinion portion of the connecting means, the connecting means comprising a ball roller mounted on the arm for rolling movement along the track when the arm is generally perpendicular to the track while permitting rotation of the connecting means about the axis perpendicular to the common plane of the arm and the track, and holding means engageable with the connecting means to prevent such rotation when the connecting means is not positioned in the end region of the track.

2. A track assembly according to claim (1), wherein the pinion portion is defined by circumferential grooves in the ball roller.

3. A track assembly according to claim (1), wherein the pinion portion is formed on a cage in which the ball roller is rotatably mounted.

4. A track assembly according to claim 3, wherein the rack is coupled to the connecting means for movement therewith along the track, stop means being provided for retaining the rack in a fixed position relative to the track when the rack is in the end region of the track.

5. A track assembly according to claim 4, wherein the rack is mounted for locking movement relative to the track and rotation of the connecting means about the axis perpendicular to the common plane of the track and arm rocks the rack between locking and releasing positions in which the rack prevents and allows, respectively, the rolling movement of the arm, and the rack is prevented from entering the releasing position by engagement with a wall portion of the track when the connecting means is not positioned in the end region of the track.

6. A track assembly according to claim 4, wherein the rack carries an abutment which engages the wall portion of the track when the connecting means is not positioned in the end region of the track to retain the rack in the locking position and which enters a recess in the track when the connecting means is in the end region of the track as the rack moves into its releasing position.

7. A track assembly according to claim (1), wherein the pinion portion is positioned such that it is in engagement with the rack at a point diametrically opposite the arm relative to the axis perpendicular to the common plane of movement of the arm and the track when the arm lies parallel to the track in the end region.

8. A track assembly according to claim 2, wherein the pinion portion is positioned such that it is in engagement with the rack at a point diametrically opposite the arm relative to the axis perpendicular to the common plane of movement of the arm and the track when the arm lies parallel to the track in the end region.

9. A track assembly according to claim 3, wherein the pinion portion is positioned such that it is in engagement with the rack at a point diametrically opposite the arm relative to the axis perpendicular to the common plane of movement of the arm and the track when the arm lies parallel to the track in the end region.

10. A track assembly according to claim 4, wherein the pinion portion is positioned such that it is in engagement with the rack at a point diametrically opposite the arm relative to the axis perpendicular to the common plane of movement of the arm and the track when the arm lies parallel to the track in the end region.

11. A track assembly according to claim 5, wherein the pinion portion is positioned such that it is in engagement with the rack at a point diametrically opposite the arm relative to the axis perpendicular to the common plane of movement of the arm and the track when the arm lies parallel to the track in the end region.

12. A track assembly according to claim 6, wherein the pinion portion is positioned such that it is in engagement with the rack at a point diametrically opposite the arm relative to the axis perpendicular to the common plane of movement of the arm and the track when the arm lies parallel to the track in the end region.

13. A track assembly according to claim (1), wherein the ball roller includes a circumferential groove which engages with a longitudinally extending ridge in the track which prevents the connecting means from rotating about the axis perpendicular to the common plane of the arm and the track except when the connecting means is in the end region of the track.

14. A track assembly according to claim 2, wherein the ball roller includes a circumferential groove which engages with a longitudinally extending ridge in the track which prevents the connecting means from rotating about the axis perpendicular to the common plane of the arm and the track except when the connecting means is in the end region of the track.

15. A track assembly according to claim 3, wherein the ball roller includes a circumferential groove which engages with a longitudinally extending ridge in the track which prevents the connecting means from rotating about the axis perpendicular to the common plane of the arm and the track except when the connecting means is in the end region of the track.

* * * * *